US012100922B2

(12) United States Patent
Liu et al.

(10) Patent No.: US 12,100,922 B2
(45) Date of Patent: *Sep. 24, 2024

(54) ELECTRICAL CONNECTOR WITH A COVER STRUCTURE AS WELL AS A MATING CONNECTOR AND A CONNECTOR ASSEMBLY

(71) Applicant: Tyco Electronics (Shanghai) Co., Ltd., Shanghai (CN)

(72) Inventors: Jiaoyong (Mac) Liu, Shanghai (CN); Jie (Roger) Luo, Shunde (CN); Guangming (Suny) Zhao, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 137 days.

This patent is subject to a terminal disclaimer.

(21) Appl. No.: 17/673,396

(22) Filed: Feb. 16, 2022

(65) Prior Publication Data

US 2022/0263282 A1 Aug. 18, 2022

(30) Foreign Application Priority Data

Feb. 18, 2021 (CN) ......................... 202110186439.8

(51) Int. Cl.
*H01R 25/16* (2006.01)
*H01R 24/60* (2011.01)

(52) U.S. Cl.
CPC ........... *H01R 25/162* (2013.01); *H01R 24/60* (2013.01)

(58) Field of Classification Search
None
See application file for complete search history.

(56) References Cited

U.S. PATENT DOCUMENTS

| | | | | |
|---|---|---|---|---|
| 11,837,825 | B2 * | 12/2023 | Liu | H01R 13/2442 |
| 2019/0089093 | A1 * | 3/2019 | Liu | H01R 4/46 |
| 2020/0244050 | A1 * | 7/2020 | Corban | H01R 24/58 |
| 2021/0313729 | A1 * | 10/2021 | Hung | H01R 13/113 |
| 2021/0328376 | A1 * | 10/2021 | Liu | H01R 4/28 |
| 2022/0094122 | A1 * | 3/2022 | Liu | H01R 4/06 |

* cited by examiner

*Primary Examiner* — Oscar C Jimenez
(74) *Attorney, Agent, or Firm* — Barley Snyder

(57) ABSTRACT

An electrical connector comprises a first terminal assembly having a longitudinally extending first plate-shaped fixing portion, a longitudinally extending first terminal portion, and a substantially laterally extending first connection portion to connect the first plate-shaped fixing portion and the first terminal portion. A second terminal assembly includes a longitudinally extending second plate-shaped fixing portion, a longitudinally extending second terminal portion, and a substantially laterally extending second connection portion to connect the second plate-shaped fixing portion and the second terminal portion. A first conductive block electrically is connected to an inner side of the first plate-shaped fixing portion of the first terminal assembly facing the second plate-shaped fixing portion of the second terminal assembly. A second conductive block is electrically connected to an inner side of the second plate-shaped fixing portion of the second terminal assembly facing the first plate-shaped fixing portion of the first terminal assembly.

22 Claims, 7 Drawing Sheets

ELECTRICAL CONNECTOR WITH A COVER STRUCTURE AS WELL AS A MATING CONNECTOR AND A CONNECTOR ASSEMBLY

CROSS-REFERENCE TO RELATED APPLICATIONS his application claims the benefit of Chinese Patent Application No. CN 202110186439.8 filed on Feb. 18, 2021 in the China National Intellectual Property Administration, the whole disclosure of which is incorporated herein by reference.

FIELD OF THE INVENTION

The present invention relates to an electrical connector, and more particularly, to an electrical connector adapted to mate with a bus bar.

BACKGROUND

In related art, a power connector generally includes an insulation housing and a terminal, including a positive terminal and a negative terminal, disposed in the insulation housing. The terminal is adapted to be in electrical contact with a bus bar, which also includes a positive bus bar and a negative bus bar, inserted into the power connector. In the related art, a current path from the terminal of the power connector to the bus bar needs to pass through a conductive block, which has defects such as large contact impedance and low conductivity. In addition, in the related art, the terminal of the power connector is usually a single-layer conductive terminal composed of a single-layer metal sheet. This single-layer conductive terminal not only has low current path density, but also has a relatively large mating force. Further, in the related art, the heat dissipation performance of the terminal of the power connector needs to be improved.

SUMMARY

According to an embodiment of the present disclosure, an electrical connector comprises a first terminal assembly having a longitudinally extending first plate-shaped fixing portion, a longitudinally extending first terminal portion, and a substantially laterally extending first connection portion to connect the first plate-shaped fixing portion and the first terminal portion. A second terminal assembly includes a longitudinally extending second plate-shaped fixing portion, a longitudinally extending second terminal portion, and a substantially laterally extending second connection portion to connect the second plate-shaped fixing portion and the second terminal portion. A first conductive block electrically is connected to an inner side of the first plate-shaped fixing portion of the first terminal assembly facing the second plate-shaped fixing portion of the second terminal assembly. A second conductive block is electrically connected to an inner side of the second plate-shaped fixing portion of the second terminal assembly facing the first plate-shaped fixing portion of the first terminal assembly.

BRIEF DESCRIPTION OF THE DRAWINGS

The invention will now be described by way of example with reference to the accompanying Figures, of which.

DETAILED DESCRIPTION OF THE EMBODIMENTS

Figure 1:
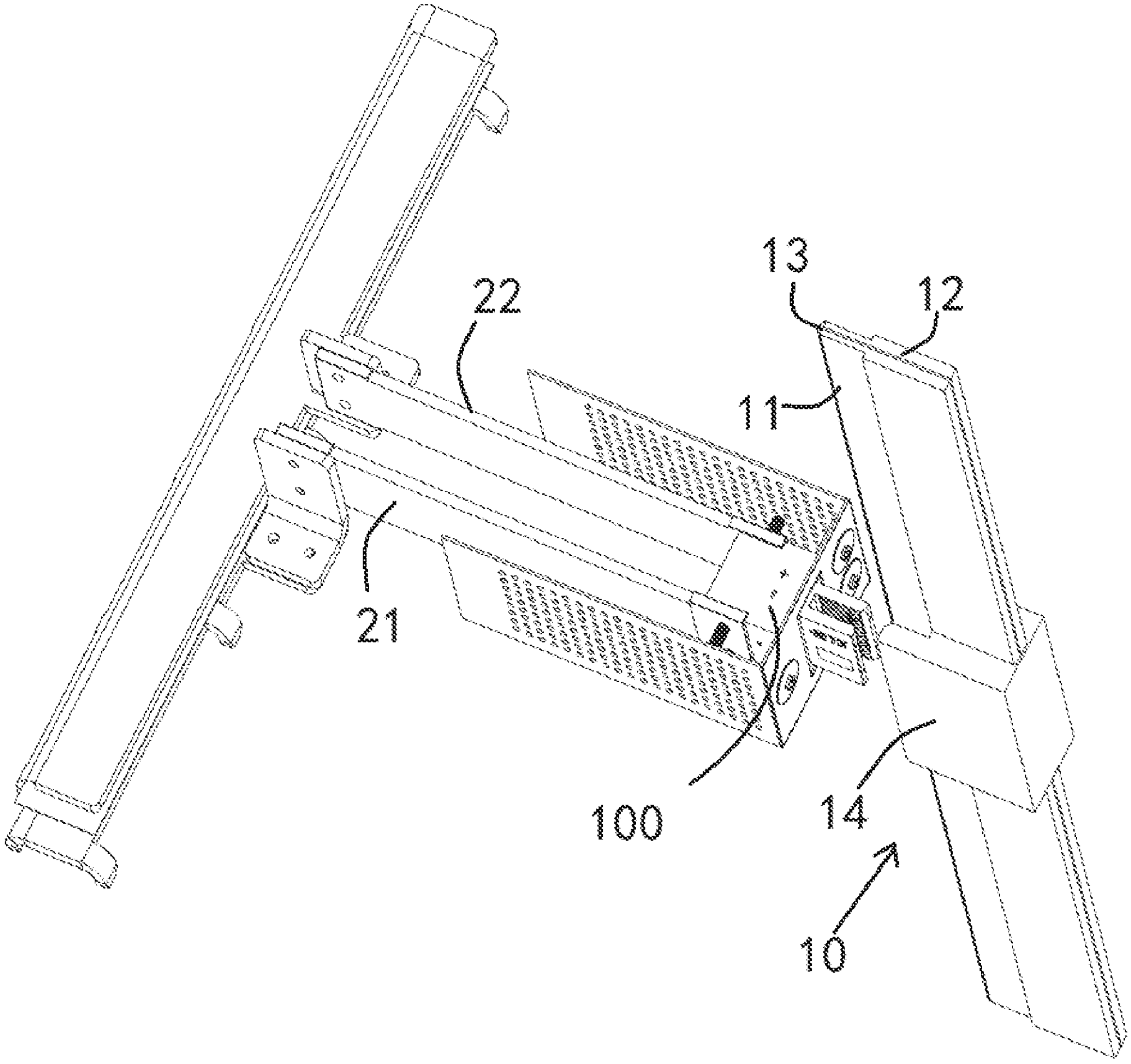
FIG. 1 shows a schematic perspective view of a connector according to an exemplary embodiment of the present disclosure, in which the connector connects a first wire and a second wire to a bus bar plug assembly.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to one general technical concept of the present disclosure, there is provided a connector including: a first terminal assembly having a longitudinally extending first plate-shaped fixing portion, a longitudinally extending first terminal portion, and a substantially laterally extending first connection portion to connect the first plate-shaped fixing portion and the first terminal portion; a second terminal assembly having a longitudinally extending second plate-shaped fixing portion, a longitudinally extending second terminal portion, and a substantially laterally extending second connection portion to connect the second plate-shaped fixing portion and the second terminal portion, wherein the first terminal assembly and the second terminal assembly are arranged to face each other and be spaced apart from each other, wherein a spacing between the first plate-shaped fixing portion and the second plate-shaped fixing portion is greater than a spacing between the first terminal portion and the second terminal portion; a first conductive block electrically connected to an inner side of the first plate-shaped fixing portion of the first terminal assembly facing the second plate-shaped fixing portion of the second terminal assembly; and a second conductive block electrically connected to an inner side of the second plate-shaped fixing portion of the second terminal assembly facing the first plate-shaped fixing portion of the first terminal assembly.

Figure 2:
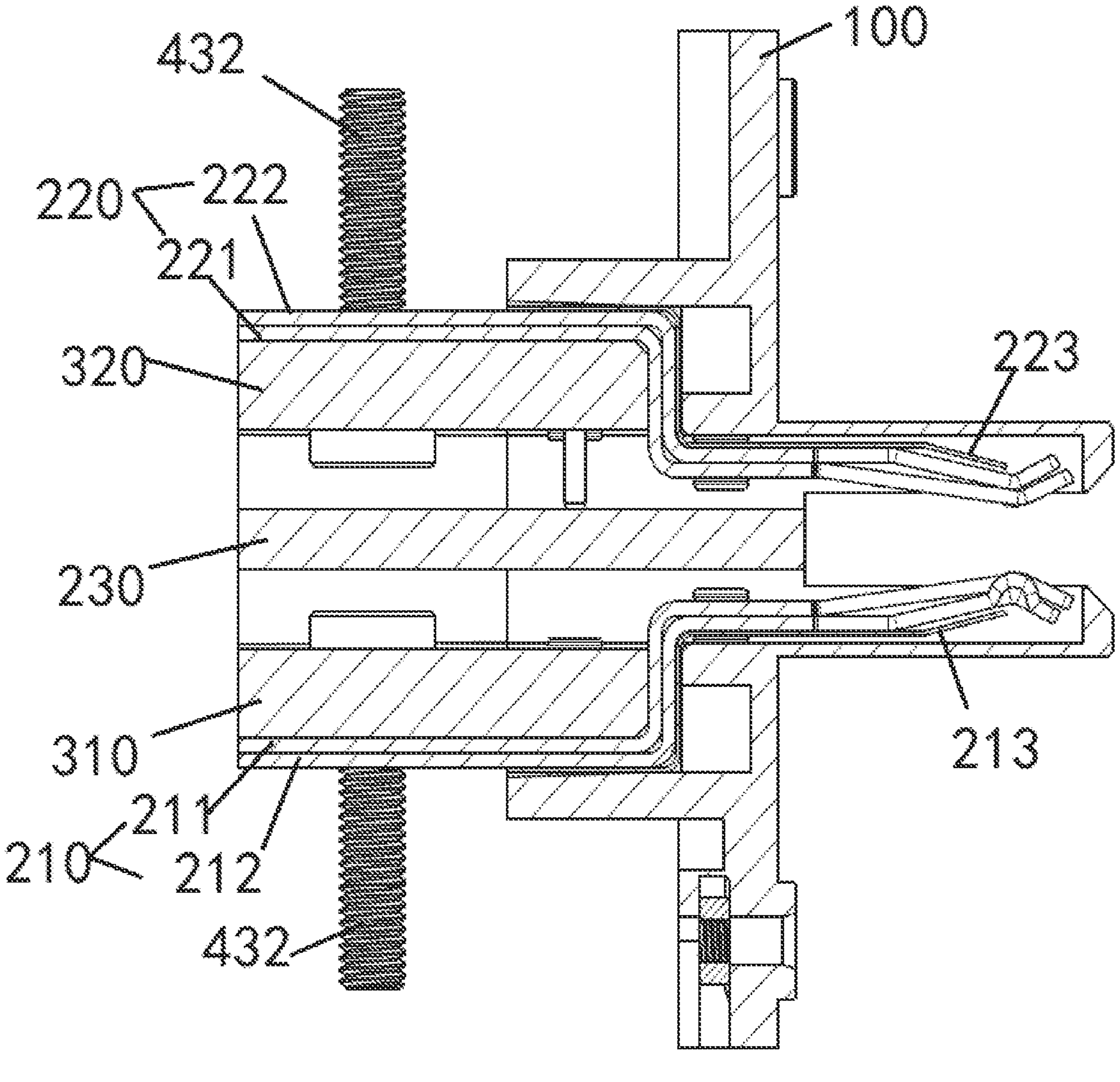
FIG. 2 shows a schematic cross-sectional view of the connector shown in FIG. 1.
Figure 3:
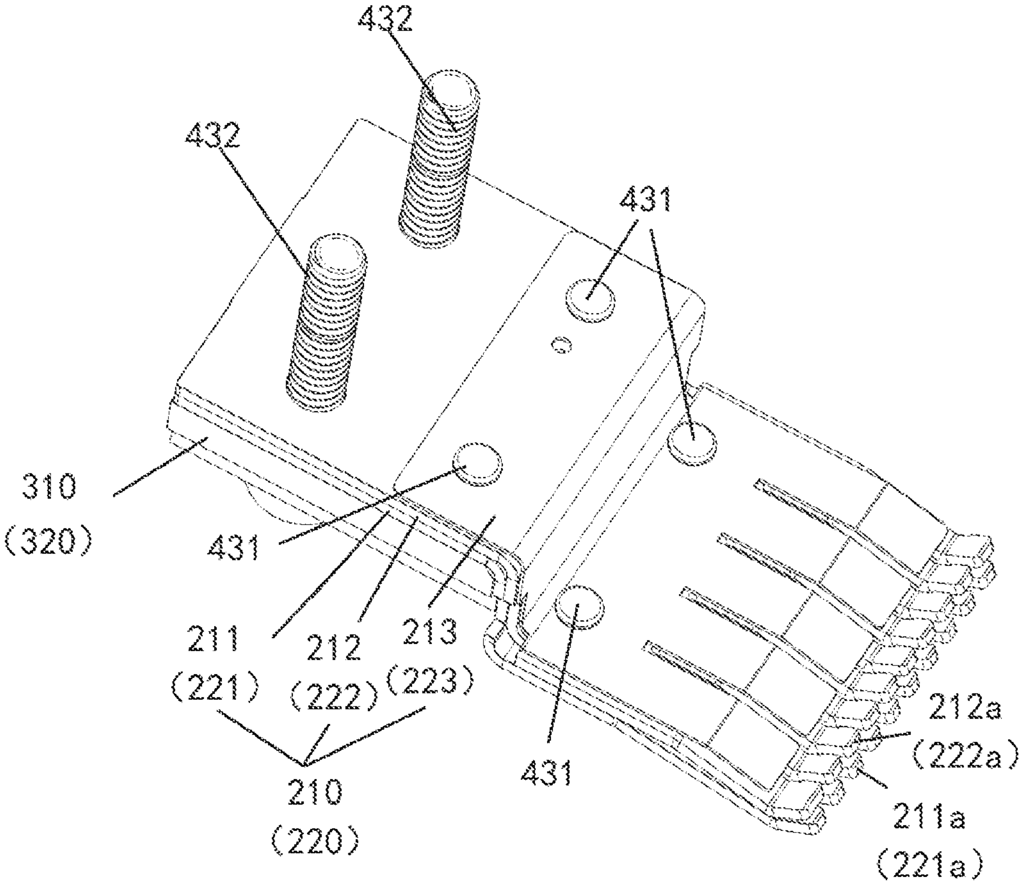
FIG. 3 shows a schematic perspective view of a first terminal assembly and a first conductive block of the connector shown in FIG. 2.

FIG. 1 shows a schematic perspective view of a connector according to an exemplary embodiment of the present disclosure, in which the connector connects a first wire and a second wire to a bus bar plug assembly. FIG. 2 shows a schematic cross-sectional view of the connector shown in FIG. 1. FIG. 3 shows a schematic perspective view of a first terminal assembly and a first conductive block of the connector shown in FIG. 2. In the illustrated embodiment, the connector includes a first terminal assembly 210 and a second terminal assembly 220. The first terminal assembly 210 is used to electrically connect a first wire 21 to a first bus bar 11 of a bus bar plug assembly 10, and the second terminal assembly 220 is used to electrically connect the second wire 22 to a second bus bar 12 of the bus bar plug assembly 10.

As shown in FIGS. 1-3, in the illustrated embodiment, the first terminal assembly 210 has a longitudinally extending first plate-shaped fixing portion (which will be described in detail later), a longitudinally extending first terminal portion (which will be described in detail later), and a substantially laterally extending first connection portion (which will be described in detail later) to connect the first plate-shaped fixing portion and the first terminal portion. The second terminal assembly 220 has a longitudinally extending second plate-shaped fixing portion (which will be described in detail later), a longitudinally extending second terminal portion (which will be described in detail later), and a substantially laterally extending second connection portion (which will be described in detail later) to connect the second plate-shaped fixing portion and the second terminal portion. The second terminal assembly 220 and the first terminal assembly 210 are arranged to face each other and be spaced apart from each other, wherein a spacing between the first plate-shaped fixing portion and the second plate-shaped fixing portion is greater than a spacing between the first terminal portion and the second terminal portion. That is, both the first terminal assembly 210 and the second terminal assembly 220 have a zigzag shape. Therefore, in the present disclosure, the terminal adopts a "Z-shaped" structure, which, compared with a conventional terminal structure, achieves a longer elastic arm and a smaller mating force in a compact space, so that the elastic terminal has better floating performance. In the illustrated embodiment, the connector includes a first conductive block 310 and a second conductive block 320. The connector further includes a first wire 21 and a second wire 22. The first conductive block 310 and the second conductive block 320 can be made of conductive materials such as copper or aluminum.

Referring to FIG. 2, the first conductive block 310 is electrically connected to an inner side of the first plate-shaped fixing portion of the first terminal assembly 210 facing the second plate-shaped fixing portion of the second terminal assembly 220. The second conductive block 320 is electrically connected to an inner side of the second plate-shaped fixing portion of the second terminal assembly 220 facing the first plate-shaped fixing portion of the first terminal assembly 210.

As shown in FIGS. 1-3, the first wire 21 is directly and electrically connected to an outer side of the first plate-shaped fixing portion of the first terminal assembly 210 away from the second plate-shaped fixing portion of the second terminal assembly 220. The second wire 22 is directly and electrically connected to an outer side of the second plate-shaped fixing portion of the second terminal assembly 220 away from the first plate-shaped fixing portion of the first terminal assembly 210. The thickness of each of the first conductive block 310 and the second conductive block 320 is greater than that of each of the first terminal assembly 210 and the second terminal assembly 220.

The first conductive block and the second conductive block are arranged on the inner sides of the first terminal assembly and the second terminal assembly facing each other, respectively, and the first wire and the second wire are arranged on the outer sides of the first and second terminal assemblies, respectively, and are respectively in direct contact with the conductive terminals of the first and second terminal assemblies respectively for electrical connection, which greatly reduces the contact impedance of the contact ends of the connector.

As shown in FIG. 2, the connector further includes an insulation separator 230 provided between the first conductive block 310 electrically connected to the first terminal assembly 210 and the second conductive block 320 electrically connected to the second terminal assembly 220, and used to electrically isolate the first terminal assembly 210 and the second terminal assembly 220.

As shown in FIGS. 1-3, in the illustrated embodiment, the connector further includes an insulation housing 100, into which the first terminal assembly 210, the second terminal assembly 220, the first conductive block 310 and the second conductive block 320 are mounted. The first terminal assembly 210 is exactly the same as the second terminal assembly 220, and the first terminal assembly 210 and the second terminal assembly 220 are symmetrically arranged in the insulation housing 100.

Figure 4:
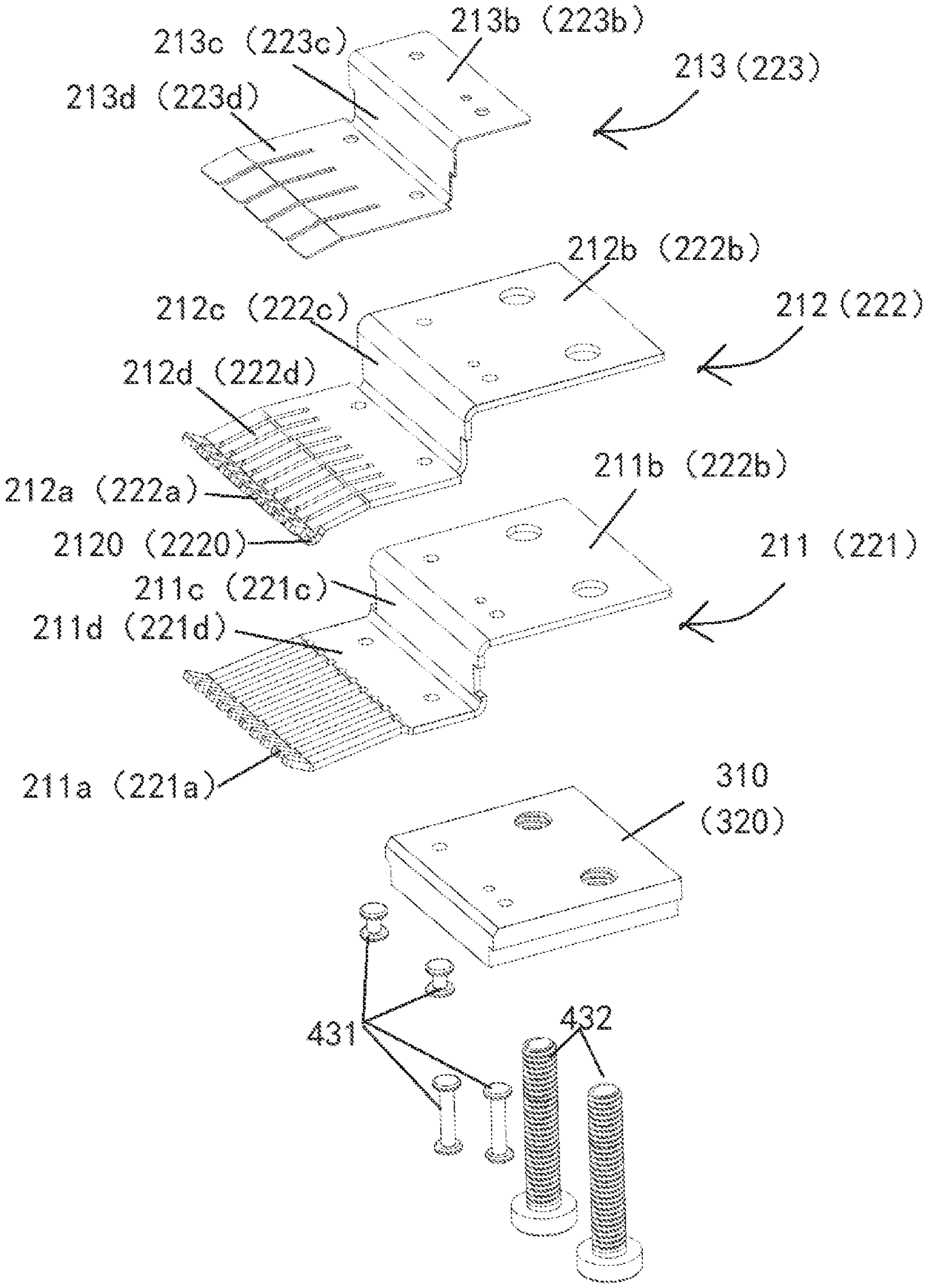
FIG. 4 shows a schematic perspective exploded view of the first terminal assembly and the first conductive block shown in FIG. 3.
Figure 5:
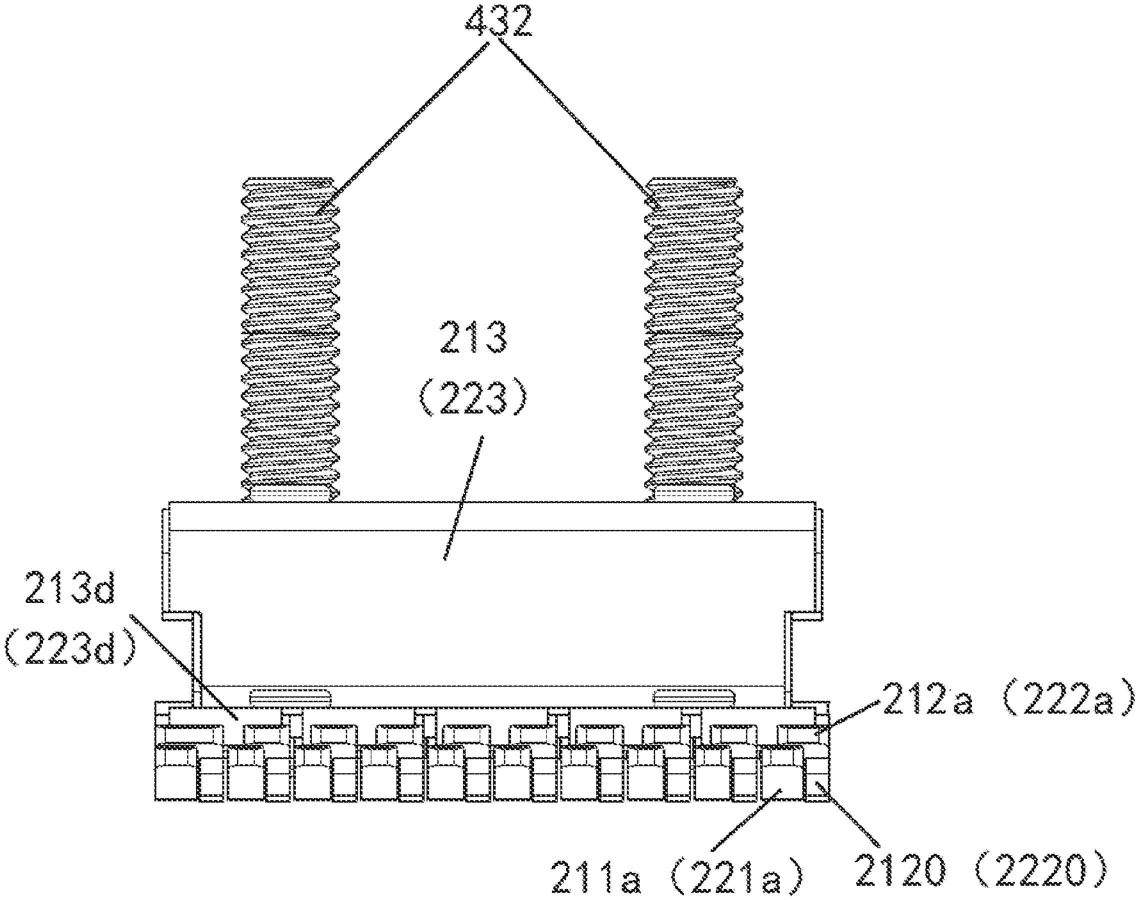
FIG. 5 shows a schematic side view of the first terminal assembly shown in FIG. 3.

For the purpose of brevity, although the first terminal assembly and the first conductive block are only shown in the connector shown in FIGS. 2 to 5 of the drawings as an example to describe the specific structure and connection relationship of the terminal assembly and the conductive block, it should be understood for the skilled in the art that the second terminal assembly 220 also includes the same structure and connection relationship because the first terminal assembly is exactly the same as the second terminal assembly, and the first terminal assembly and the second terminal assembly are symmetrically arranged in the insulation housing. FIG. 3 shows a schematic perspective view of a first terminal assembly and a first conductive block of the connector shown in FIG. 2. FIG. 4 shows a schematic perspective exploded view of the first terminal assembly and the first conductive block shown in FIG. 3. FIG. 5 shows a schematic side view of the first terminal assembly shown in FIG. 3.

As shown in FIGS. 2-4, each of the first terminal assembly 210 and the second terminal assembly 220 includes a first terminal 211, 221 and a second terminal 212, 222. The first terminal 211, 221 has a first substrate portion 211*b*, 221*b* at one end thereof, a first cantilever portion 211*d*, 221*d* at the other end thereof, and a first connection plate portion 211*c*, 221*c* to connect the first substrate portion 211*b*, 221*b* and the first cantilever portion 211*d*, 221*d*. The second terminal 212, 222 is laminated on an outside of the first terminal 211, 221, and has a second substrate portion 212*b*, 222*b* at one end thereof, a second cantilever portion 212*d*, 222*d* at the other end thereof, and a second connection plate portion 212*c*, 222*c* to connect the second substrate portion 212*b*, 222*b* and the second cantilever portion 212*d*, 222*d*.

Specifically, in the illustrated embodiment, the first substrate portion 211*b*, 221*b* is laminated on an inner surface of the second substrate portion 212*b*, 222*b*, and the first conductive block 310 is laminated on an inner surface of the first substrate portion 211*b*, 221*b*. The first plate-shaped fixing portion of the first terminal assembly 210 is formed by the first substrate portion 211*b*, 221*b* and the second substrate portion 212*b*, 222*b* together. The first terminal portion of the first terminal assembly 210 is formed by the first cantilever portion 211*d*, 221*d* and the second cantilever portion 212*d*, 222*d* together. The first connection portion of the first terminal assembly 210 is formed by the first connection plate portion 211*c*, 221*c* and the second connection plate portion 212*c*, 222*c* together.

Referring now to FIGS. 2-5, in the exemplary embodiment, the first cantilever portion 211*d*, 221*d* has a plurality of first elastic arms 211*a*, 221*a*, and the second cantilever portion 212*d*, 222*d* has a plurality of second elastic arms 212*a*, 222*a*, each of the second elastic arms 212*a*, 222*a* having a hook 2120, 2220. The plurality of first elastic arms 211*a*, 221*a* and the plurality of second elastic arms 212*a*, 222*a* are alternatively arranged in a row to be in electrical contact with one first bus bar 11, 12. The plurality of first elastic arms 211*a*, 221*a* are arranged in a first row, and the plurality of second elastic arms 212*a*, 222*a* are arranged in a second row laminated above the first row, and the hooks 2120, 2220 of the plurality of second elastic arms 212*a*, 222*a* extends between two adjacent first elastic arms 211*a*, 221*a* of the plurality of first elastic arms 211*a*, 221*a* located in the first row, respectively.

Each of the first terminal assembly 210 and the second terminal assembly 220 includes: a third terminal 213, 223 laminated on an outside of the second terminal 212, 222, and having a third substrate portion 213*b*, 223*b* at one end thereof, a third cantilever portion 213*d*, 223*d* at the other end thereof, and a third connection plate portion 213*c*, 223*c* to connect the third substrate portion 213*b*, 223*b* and the third cantilever portion 213*d*, 223*d*. According to an embodiment of the present disclosure, the conductivity performance of the first terminal 211, 221 and the second terminal 212, 222 is better than that of the third terminal 213, 223. The mechanical performance of the third terminal 213, 223 is better than that of the first terminal 211, 221 and the second terminal 212, 222, so that the third terminal 213, 223 can assist in supporting the first terminal 211, 221 and the second terminal 212, 222 to provide greater terminal clamping force. In an embodiment of the present disclosure, the first terminal 211, 221 and the second terminal 212, 222 are made of copper, and the third terminal 213, 223 may be made of stainless steel.

Therefore, the connector provided by the present disclosure has two rows of terminals laminated up and down, the elastic arms of which are alternately arranged in a row, and the hook of the plurality of second elastic arms of the terminals located in the upper row extends between two adjacent first elastic arms of the plurality of first elastic arms located in the lower row, respectively, so that the thickness the cross section of the terminal becomes twice that of the conventional staggered terminal structure, thus the conductivity at the contact end of the connector is greatly increased.

As shown in FIG. 2, the connector further includes an insulation housing 100, into which the first terminal assembly 210, the second terminal assembly 220, the first conductive block 310 and the second conductive block 320 are mounted. As shown in FIG. 2, the first terminal 211, the second terminal 212, and the third terminal 213 of each of the first terminal assembly 210 and the second terminal assembly 220 are connected to the corresponding conductive block (i.e. the first conductive block 310 or the second conductive block 320) via a first fastener 431. The first terminal 211, the second terminal 212, the third terminal 213 of each of the first terminal assembly 210 and the second terminal assembly 220, and the corresponding conductive block (i.e. the first conductive block 310 or the second conductive block 320) are connected to the corresponding one of the first wire 21 and the second wire 22 via a second fastener 432.

Specifically, as shown in FIGS. 2 to 4, in the illustrated embodiment, the first wire 21 and the second wire 22 extend into the insulation housing 100 from one side of the insulation housing 100, and a slot 110 is formed in the other side of the insulation housing 100 and configured for insertions of the first bus bar 11 and the second bus bar 12 of the bus bar plug assembly 10. The first bus bar 11 is in electrical contact with the plurality of first elastic arms 211*a* and the plurality of second elastic arms 212*a* of the first terminal assembly 210, so that the first wire 21 may be electrically connected to the first bus bar 11 via the first terminal assembly 210; and the second bus bar 12 is in electrical contact with the plurality of first elastic arms 211*a* and the plurality of second elastic arms 212*a* of the second terminal assembly 220, so that the second wire 21 may be electrically connected to the second bus bar 12 via the second terminal assembly 220. The bus bar plug assembly 10 further includes an insulation separation layer 13 disposed between the first bus bar 11 and the second bus bar 12, and the first bus bar 11 and the second bus bar 12 are integrated on both sides of the insulation separation layer 13, respectively. In addition, the bus bar plug assembly 10 further includes an insulation body 14, in which the first bus bar 11, the second bus bar 12 and the insulation separation layer 13 integrated together are assembled.

Figure 6:
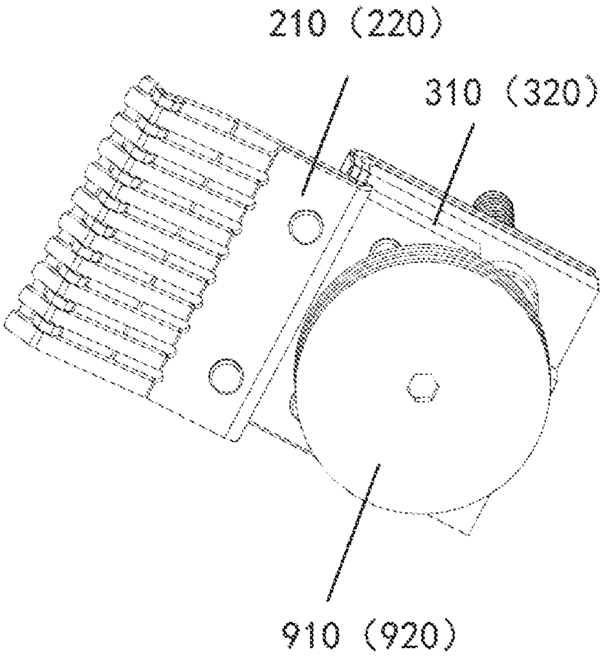
FIG. 6 shows a schematic perspective view of a connector mounted with a heat sink according to an exemplary embodiment of the present disclosure, in which the insulation housing is removed.
Figure 7:
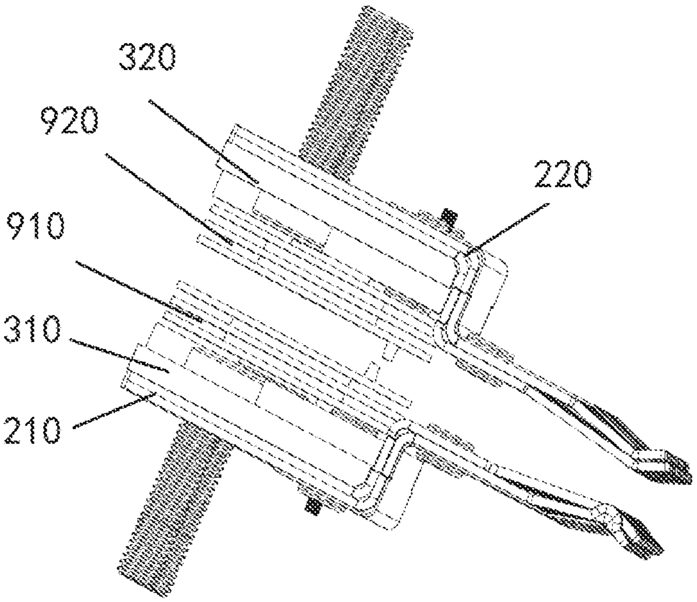
FIG. 7 shows a schematic perspective view of the heat sink of the connector shown in FIG. 6.
Figure 8:
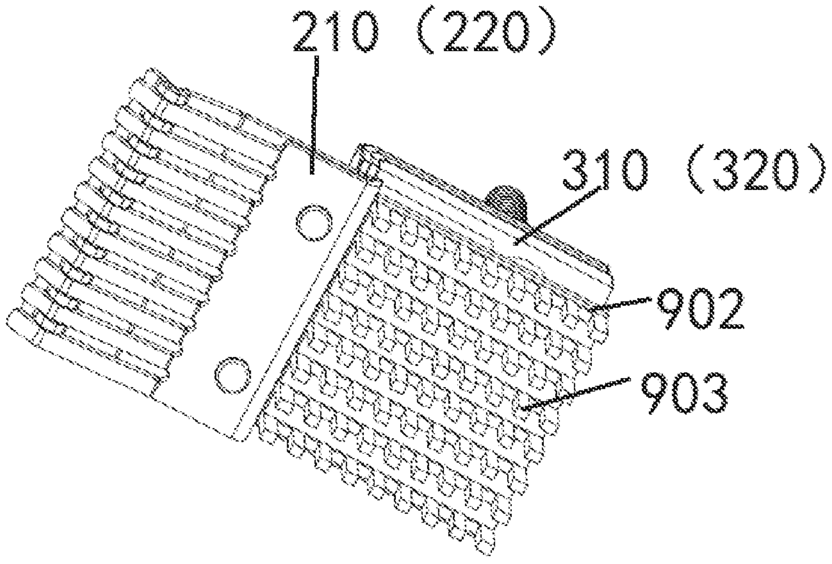
FIG. 8 shows a schematic perspective view of a connector mounted with a heat sink according to another exemplary embodiment of the present disclosure, in which the insulation housing is removed.
Figure 9:
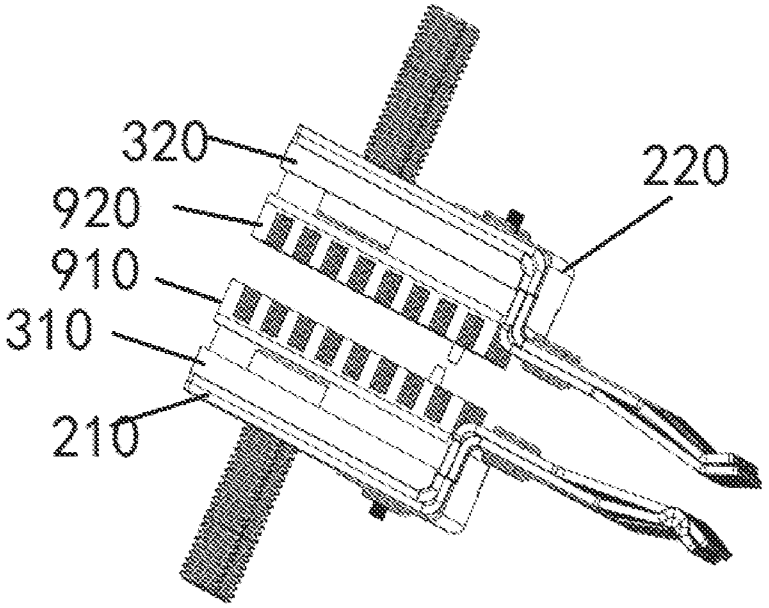
FIG. 9 shows a schematic perspective view of the heat sink of the connector shown in FIG. 8.

FIG. 6 shows a schematic perspective view of a connector mounted with a heat sink according to an exemplary embodiment of the present disclosure, in which the insulation housing is removed. FIG. 7 shows a schematic perspective view of the heat sink of the connector shown in FIG. 6. FIG. 8 shows a schematic perspective view of a connector mounted with a heat sink according to another exemplary embodiment of the present disclosure, in which the insulation housing is removed. FIG. 9 shows a schematic perspective view of the heat sink of the connector shown in FIG. 8.

As shown in FIGS. 6-9, the connector provided by the present disclosure further includes: a first heat sink 910 and a second heat sink 920. The first heat sink 910 is attached to an inner surface of the first conductive block 310 away from the first terminal assembly 210. The second heat sink 920 is attached to an inner surface of the second conductive block 320 away from the second terminal assembly 220.

In an exemplary embodiment as shown in FIGS. 6 and 7, each of the first heat sink 910 and the second heat sink 920 is formed by laminating a plurality of disc-shaped fins.

In another exemplary embodiment as shown in FIGS. 8 and 9, each of the first heat sink 910 and the second heat sink 920 includes: a substrate 902, and a plurality of heat dissipation pillars 903 extending from one side of the substrate 902 and arranged in a matrix. Therefore, in the connector provided by the present disclosure, each of the first conductive block 310 and the second conductive block 320 includes a feature/structure made of a heat dissipation material, which greatly improves the heat dissipation performance of the terminal.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a first terminal assembly having a longitudinally extending first plate-shaped fixing portion, a longitudinally extending first terminal portion, and a substantially laterally extending first connection portion to connect the first plate-shaped fixing portion and the first terminal portion;

a second terminal assembly having a longitudinally extending second plate-shaped fixing portion, a longitudinally extending second terminal portion, and a substantially laterally extending second connection portion to connect the second plate-shaped fixing portion and the second terminal portion, the first terminal assembly and the second terminal assembly oppose each other and are spaced apart from each other, a spacing between the first plate-shaped fixing portion and the second plate-shaped fixing portion is greater than a spacing between the first terminal portion and the second terminal portion;

a first conductive block electrically connected to an inner side of the first plate-shaped fixing portion of the first terminal assembly facing the second plate-shaped fixing portion of the second terminal assembly; and a second conductive block electrically connected to an inner side of the second plate-shaped fixing portion of the second terminal assembly facing the first plate-shaped fixing portion of the first terminal assembly.

2. The connector according to claim 1, further comprising:

a first wire directly and electrically connected to an outer side of the first plate-shaped fixing portion of the first terminal assembly away from the second plate-shaped fixing portion of the second terminal assembly; and a second wire directly and electrically connected to an outer side of the second plate-shaped fixing portion of the second terminal assembly away from the first plate-shaped fixing portion of the first terminal assembly.

3. The connector according to claim 1, wherein a thickness of each of the first conductive block and the second conductive block is greater than that of each of the first terminal assembly and the second terminal assembly.

4. The connector according to claim 1, further comprising an insulation separator arranged between the first conductive block and the second conductive block, the insulation separator electrically isolating the first terminal assembly and the second terminal assembly.

5. A connector, comprising:

a first terminal assembly having a longitudinally extending first plate-shaped fixing portion, a longitudinally extending first terminal portion, and a substantially laterally extending first connection portion to connect the first plate-shaped fixing portion and the first terminal portion;

a second terminal assembly having a longitudinally extending second plate-shaped fixing portion, a longitudinally extending second terminal portion, and a substantially laterally extending second connection portion to connect the second plate-shaped fixing portion and the second terminal portion, the first terminal assembly and the second terminal assembly oppose each other and are spaced apart from each other, a spacing between the first plate-shaped fixing portion and the second plate-shaped fixing portion is greater than a spacing between the first terminal portion and the second terminal portion, each of the first terminal assembly and the second terminal assembly comprises:

a first terminal, having:

a first substrate portion at one end thereof;

a first cantilever portion at the other end thereof; and a first connection plate portion connecting the first substrate portion and the first cantilever portion; and a second terminal arranged over an outside of the first terminal, having:

a second substrate portion at one end thereof;

a second cantilever portion at the other end thereof; and a second connection plate portion connecting the second substrate portion and the second cantilever portion;

a first conductive block electrically connected to an inner side of the first plate-shaped fixing portion of the first terminal assembly facing the second plate-shaped fixing portion of the second terminal assembly; and a second conductive block electrically connected to an inner side of the second plate-shaped fixing portion of the second terminal assembly facing the first plate-shaped fixing portion of the first terminal assembly, wherein:

the first cantilever portion includes a plurality of first elastic arms, and the second cantilever portion includes a plurality of second elastic arms, each of the second elastic arms having a hook;

the plurality of first elastic arms and the plurality of second elastic arms are alternatively arranged in a row to be in electrical contact with one bus bar; and the plurality of first elastic arms are arranged in a first row, and the plurality of second elastic arms are arranged in a second row laminated above the first row, and the hooks of the plurality of second elastic arms extend between two adjacent first elastic arms of the plurality of first elastic arms located in the first row, respectively.

6. The connector according to claim 5, wherein:

the first substrate portion is laminated on an inner surface of the second substrate portion, and the first conductive block is laminated on an inner surface of the first substrate portion;

the first plate-shaped fixing portion of the first terminal assembly is formed by the first substrate portion and the second substrate portion;

the first terminal portion of the first terminal assembly is formed by the first cantilever portion and the second cantilever portion; and the first connection portion of the first terminal assembly is formed by the first connection plate portion and the second connection plate portion.

7. The connector according to claim 5, wherein each of the first terminal assembly and the second terminal assembly comprises a third terminal laminated on an outside of the second terminal, and having a third substrate portion at one end thereof, a third cantilever portion at the other end thereof, and a third connection plate portion to connect the third substrate portion and the third cantilever portion.

8. The connector according to claim 7, wherein the third terminal is made of a material different from a material of the first terminal or the second terminal.

9. The connector according to claim 8, wherein the first terminal and the second terminal are made of copper, and the third terminal is made of stainless steel.

10. The connector according to claim 7, further comprising an insulation housing into which the first terminal assembly, the second terminal assembly, the first conductive block and the second conductive block are mounted.

11. The connector according to claim 10, wherein:

the first terminal, the second terminal, and the third terminal of each of the first terminal and the second terminal assembly are connected to the corresponding conductive block of the first conductive block and the second conductive block by a first fastener; and the first terminal, the second terminal, the third terminal of each of the first terminal assembly and the second terminal assembly, and a corresponding conductive block of the first conductive block and the second conductive block are connected to a corresponding one of the first wire and the second wire by a second fastener.

12. The connector according to claim 11, wherein:

the first wire and the second wire extend into the insulation housing from one side of the insulation housing, and a slot is formed in the other side of the insulation housing and configured for insertions of the first bus bar and the second bus bar of the bus bar plug assembly; and wherein the first bus bar is in electrical contact with the plurality of first elastic arms and the plurality of second elastic arms of the first terminal assembly, so that the first wire is electrically connected to the first bus bar via the first terminal assembly; and the second bus bar is in electrical contact with the plurality of first elastic arms and the plurality of second elastic arms of the second terminal assembly, so that the second wire is electrically connected to the second bus bar via the second terminal assembly.

13. The connector according to claim 12, wherein the bus bar plug assembly further comprises an insulation separation layer disposed between the first bus bar and the second bus bar, and the first bus bar and the second bus bar are integrated on both sides of the insulation separation layer, respectively.

14. The connector according to claim 13, wherein the bus bar plug assembly further comprises an insulation body in which the first bus bar, the second bus bar and the insulation separation layer are assembled.

15. The connector according to claim 10, wherein the first terminal assembly is identical to the second terminal assembly, and the first terminal assembly and the second terminal assembly are symmetrically arranged in the insulation housing.

16. The connector according to claim 7, further comprising:

a first heat sink attached to an inner surface of the first conductive block away from the first terminal assembly; and a second heat sink attached to an inner surface of the second conductive block away from the second terminal assembly.

17. The connector according to claim 16, wherein each of the first heat sink and the second heat sink is formed by laminating a plurality of disc-shaped fins.

18. The connector according to claim 16, wherein each of the first heat sink and the second heat sink comprises:

a substrate; and a plurality of heat dissipation pillars extending from one side of the substrate and arranged in a matrix.

19. A connector, comprising:

a first terminal assembly having a longitudinally extending first plate-shaped fixing portion, a longitudinally extending first terminal portion, and a substantially laterally extending first connection portion to connect the first plate-shaped fixing portion and the first terminal portion;

a second terminal assembly having a longitudinally extending second plate-shaped fixing portion, a longitudinally extending second terminal portion, and a substantially laterally extending second connection portion to connect the second plate-shaped fixing portion and the second terminal portion, the first terminal assembly and the second terminal assembly oppose each other and are spaced apart from each other, a spacing between the first plate-shaped fixing portion and the second plate-shaped fixing portion is greater than a spacing between the first terminal portion and the second terminal portion, each of the first terminal assembly and the second terminal assembly includes:

a first terminal having a first substrate portion at one end thereof, a first cantilever portion at the other end thereof, and a first connection plate portion connecting the first substrate portion and the first cantilever portion, the first connection plate portion extending between the first substrate portion and the first cantilevered portion in a non-parallel direction relative to the first substrate portion and the first cantilever portion; and a second terminal arranged over an outside of the first terminal, and having a second substrate portion at one end thereof, a second cantilever portion at the other end thereof, and a second connection plate portion connecting the second substrate portion and the second cantilever portion;

a first conductive block electrically connected to an inner side of the first plate-shaped fixing portion of the first terminal assembly facing the second plate-shaped fixing portion of the second terminal assembly; and a second conductive block electrically connected to an inner side of the second plate-shaped fixing portion of the second terminal assembly facing the first plate-shaped fixing portion of the first terminal assembly.

20. The connector according to claim 19, wherein the first terminal assembly and the second terminal assembly are in a Z-shape.

21. The connector according to claim 19, wherein the first connection plate portion extends at least partially in a thickness direction of the first conductive block and generally normal to the first substrate portion.

22. A connector, comprising:

a first terminal assembly having a longitudinally extending first plate-shaped fixing portion, a longitudinally extending first terminal portion, and a substantially laterally extending first connection portion to connect the first plate-shaped fixing portion and the first terminal portion;

a second terminal assembly having a longitudinally extending second plate-shaped fixing portion, a longitudinally extending second terminal portion, and a substantially laterally extending second connection portion to connect the second plate-shaped fixing portion and the second terminal portion, the first terminal assembly and the second terminal assembly oppose each other and are spaced apart from each other, a spacing between the first plate-shaped fixing portion and the second plate-shaped fixing portion is greater than a spacing between the first terminal portion and the second terminal portion, each of the first terminal assembly and the second terminal assembly includes:

a first terminal having a first substrate portion at one end thereof, a first cantilever portion at the other end thereof, and a first connection plate portion connecting the first substrate portion and the first cantilever portion;

a second terminal arranged over an outside of the first terminal, and having a second substrate portion at one end thereof, a second cantilever portion at the other end thereof, and a second connection plate portion connecting the second substrate portion and the second cantilever portion; and a third terminal arranged on an outside of the second terminal, and having a third substrate portion at one end thereof, a third cantilever portion at the other end thereof, and a third connection plate portion to connect the third substrate portion and the third cantilever portion;

a first conductive block electrically connected to an inner side of the first plate-shaped fixing portion of the first terminal assembly facing the second plate-shaped fixing portion of the second terminal assembly; and a second conductive block electrically connected to an inner side of the second plate-shaped fixing portion of the second terminal assembly facing the first plate-shaped fixing portion of the first terminal assembly.

* * * * *